US008537306B2

(12) United States Patent
Lee

(10) Patent No.: US 8,537,306 B2
(45) Date of Patent: Sep. 17, 2013

(54) BACKLIGHT ASSEMBLY FOR LIQUID CRYSTAL DISPLAY

(75) Inventor: Sang Bum Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1341 days.

(21) Appl. No.: 11/639,317

(22) Filed: Dec. 15, 2006

(65) Prior Publication Data

US 2008/0002096 A1 Jan. 3, 2008

(30) Foreign Application Priority Data

Jun. 29, 2006 (KR) .................. 10-2006-0060016

(51) Int. Cl.
*G02F 1/1333* (2006.01)
*G02F 1/1335* (2006.01)
*F21V 7/04* (2006.01)

(52) U.S. Cl.
USPC ............... 349/70; 349/58; 349/60; 349/61; 362/632; 362/633; 362/634

(58) Field of Classification Search
USPC .................. 349/58–61, 70; 362/632–634
See application file for complete search history.

(56) References Cited

U.S. PATENT DOCUMENTS

| 2004/0012971 A1* | 1/2004 | Tsai et al. .................... 362/390 |
| 2004/0263714 A1* | 12/2004 | Huang et al. ................. 349/58 |
| 2005/0134760 A1* | 6/2005 | Jeong et al. .................. 349/58 |
| 2005/0265020 A1* | 12/2005 | Kim ............................ 362/225 |
| 2007/0030663 A1* | 2/2007 | Ryu ............................. 362/29 |

FOREIGN PATENT DOCUMENTS

JP 2004-342576 12/2004
KR 10-2005-0107034 11/2005

* cited by examiner

*Primary Examiner* — Jessica M Merlin
(74) *Attorney, Agent, or Firm* — McKenna Long & Aldridge, LLP

(57) ABSTRACT

A backlight assembly for a liquid crystal display includes: one U-shaped lamp; a lamp housing including the lamp; a side supporter fastened to the lamp housing and including an inserting part where the lamp is inserted; and a lamp support member that supports and fixes the lamp within the inserting part of the side supporter.

17 Claims, 5 Drawing Sheets

BACKLIGHT ASSEMBLY FOR LIQUID CRYSTAL DISPLAY

This application claims the benefit of Korean Patent Application No. 2006-0060016, filed on Jun. 29, 2006, which is hereby incorporated by reference for all purposes as if fully set forth herein.

BACKGROUND OF THE INVENTION

1. Field of the Invention

This document relates to a liquid crystal display, and more particularly, to a backlight assembly for a liquid crystal display with a U-shaped lamp.

2. Discussion of the Related Art

The liquid crystal display displays an image corresponding to a video signal in a liquid crystal display panel by adjusting the light transmittance of liquid crystal using an electric field. In a passive light emitting liquid crystal display, a backlight used as a light source is mounted at the rear of a liquid crystal panel, and because mounting of the backlight at the rear may increase the thickness, weight, and power consumption of the liquid crystal display, research regarding improving backlights is ongoing.

In general, a so-called backlight used as a light source of the liquid crystal display includes a cylindrical fluorescent lamp, and backlights may include two types: a direct backlight type and a light guiding plate type.

In the direct backlight type, a fluorescent lamp is arranged in a flat plane, but because a shape of the fluorescent lamp is visible on the liquid crystal panel, a light scattering means should be arranged so as to uniformly distribute light from the fluorescent lamp, so there is a limit in the decrease in thickness possible.

Further, as the size of a panel increases, the area of a light emitting plane of the backlight increases. When the size of the direct backlight increases, the light emitting plane is not uniform if light scattering means is not of sufficient thickness, so the light scattering means needs to have a sufficient thickness in order to have a uniform display.

For a light guiding plate type backlight, a fluorescent lamp is provided at an edge of the display, and light is distributed across the entire plane using the light guiding plate. As a result, from the fluorescent bulb the brightness of the display is low. Further, in order to uniformly distribute light, an advanced optical design technology and processing technology for the light guiding plate are required.

Because the direct backlight type and the light guiding plate type have advantages and disadvantages, the direct backlight type backlight is generally used in a liquid crystal display where brightness is more important than the thickness of a screen, and the light guiding plate type backlight is generally used in a liquid crystal display where thickness is more important than brightness such as in a notebook PC or a monitor for a PC.

Recently, a method of manufacturing a lamp in a U-shape has been developed, and in the U-shaped lamp, because a distance between electrodes at both ends is short, a tube current can be easily measured and brightness can be accurately measured.

FIG. 1 is an exploded perspective view of a liquid crystal module including a backlight with a general U-shaped lamp.

Referring to FIG. 1, a general liquid crystal module includes a liquid crystal panel 100, a backlight assembly 150, and a top cover 160.

The liquid crystal panel 100 includes a lower substrate 110, a upper substrate 120, liquid crystal (not shown), a gate tape carrier package (TCP) 130, a gate printed circuit board (PCB) 135, a data TCP 140, and a data PCB 145.

The backlight assembly 150 includes an optical sheet 151, a diffusion plate 152, a support main 153, U-shaped lamps 154, and a reflecting plate 155.

The U-shaped lamps 154 irradiate light, and the reflecting plate 155 is below the lamp 154 to reflect light emitted below the lamp 154 toward the upper diffusion plate 152.

After light irradiated from the U-shaped lamp 154 and light reflected by the reflecting plate 155 is diffused to have uniform brightness by the diffusion plate 152, the combined light is focused by the optical sheet 151 such as a prism.

The elements of the backlight assembly 150 described above are in an internal space defined by coupling the support main 153 and the bottom cover 170, and the bottom cover 170 is also coupled to the top cover 160 to form a liquid crystal module.

FIG. 2 is a view illustrating a backlight assembly in the related art in which U-shaped lamps are used. FIG. 3 is a view illustrating the U-shaped lamp of FIG. 2 inserted into an inserting part formed in a side supporter 220.

Referring to FIG. 2, the backlight assembly in the related art using the U-shaped may include a lamp housing 210, a side supporter 220, and a U-shaped lamps 230. The backlight assembly shown in FIG. 1 is described with the optical sheet 151, the diffusion plate 152, the support main 153, and the reflecting plate 155. However, for convenience, in FIG. 2, only the lamp housing 210, the side supporter 220, and the U-shaped lamp 230 are described.

As shown in FIG. 2, in the backlight assembly in the related art using the U-shaped lamp, the lamp housing 210 may be a bottom cover and when one side of the lamp housing 210 is opened, the side supporter 220 is fastened to the lamp housing 210. The side supporter 220 has a structure for inserting the U-shaped lamp 230, but does not fix the U-shaped lamp 230.

Specifically, referring to FIG. 3, when directly inserting and fixing the U-shaped lamp 230 into the side supporter 220, there is a problem where the lamp 230 is not stably fixed due to a tolerance of the lamp 230 and a tolerance of the inserting part 221 within the side supporter 220. Particularly, in a liquid crystal display for a TV, there is a problem that sound vibration may be generated in the lamp 230 by sound from a speaker in the TV.

SUMMARY OF THE INVENTION

Accordingly, the present invention is directed to a backlight assembly for a liquid crystal display that substantially obviates one or more of the problems due to limitations and disadvantages of the related art.

An advantage of the present invention is to provide a backlight assembly for a liquid crystal display that can stably fix a U-shaped lamp.

Another advantage of the present invention is to provide a backlight assembly for a liquid crystal display that prevent vibration of a lamp in a liquid crystal display for a TV due to sound.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the present invention, as embodied and broadly described, a backlight assembly for a liquid crystal display includes: one U-shaped lamp; a lamp housing including the lamp; a side supporter fastened to the lamp housing and including an inserting part where the lamp is inserted; and a lamp support member that supports and fixes the lamp within the inserting part of the side supporter.

In another aspect of the present invention, a liquid crystal module includes: a liquid crystal panel with a liquid crystal between an upper substrate and a lower substrate; a backlight that supplies light to the liquid crystal panel; an optical scattering means between the backlight and the liquid crystal panel that supplies the light to the liquid crystal panel so that light supplied from the backlight has uniform brightness distribution; and a top cover fastened to a bottom cover within the backlight to protect the liquid crystal panel, the backlight comprises: one U-shaped lamp; a lamp housing including the lamp; a side supporter fastened to the lamp housing and including an inserting part where the lamp is inserted; and a lamp support member that supports and fixes the lamp within the inserting part of the side supporter.

In another aspect of the present invention, a manufacturing method of a backlight assembly for a liquid crystal display includes: providing one U-shaped lamp in a lamp housing; fastening a side supporter including an inserting part for inserting the lamp to a lamp housing; and supporting and fixing the lamp within the inserting part of the side supporter by a lamp support member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, examples of which is illustrated in the accompanying drawings.

Figure 4:
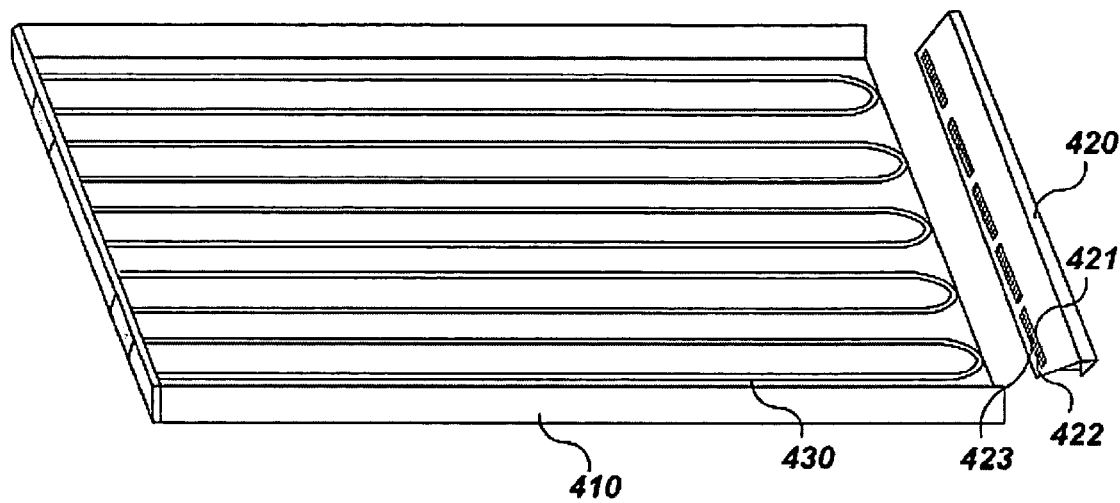
FIG. 4 is a view illustrating an implementation of a backlight assembly using a U-shaped lamp.

FIG. 4 is a view illustrating an embodiment of a backlight assembly using a U-shaped lamp.

Referring to FIG. 4, the backlight assembly includes a lamp housing 410, a side supporter 420, and at least one U-shaped lamp 430, and an inserting part 421 is formed in the side supporter 420, and a plate 422 in which a boss 423 is formed is arranged within the inserting part. The plate 422 and the boss 423 function as a lamp support member by coupling.

A phosphor is coated on an inner wall of the U-shaped lamp 430, and an electrode (not shown) made of a conductor is formed at both ends of the U-shaped lamp 430. A power line for supplying power to drive the lamp is connected to both electrodes of the lamp 430, and the power line is connected to a driving circuit through connection to a separate connector.

Because electrodes at both ends of one lamp 430 are adjacent to each other, the power line connected to the electrodes is fastened to a single connector. A plurality of lamps 430 is arranged at an inner side of a bottom cover 410 that is a lamp housing to emit light.

The lamp housing 410 may be a bottom cover, and at least one U-shaped lamp 430 is provided therein. Also, a reflecting plate is arranged at the inside of the bottom cover 410 to reflect light provided from the U-shaped lamp 430, thereby increasing efficiency of the light source.

The side supporter 420 is fastened to the lamp housing 410, and the inserting part 421 for inserting the lamp 430 is formed in the side supporter 420.

The lamp support member supports and fixes the lamp 430 within the inserting part 421 of the side supporter 420.

The lamp support member may include a plate 422 that is a tension bar providing an elastic force and a boss 423 formed in a central part of the plate 422.

Figure 5:
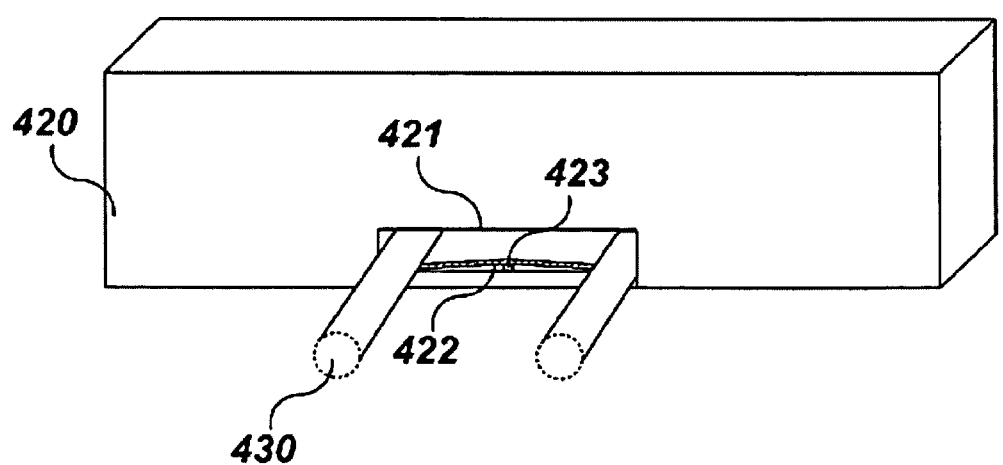
FIG. 5 is a view illustrating the U-shaped lamp inserted into an inserting part formed in a side supporter according to an embodiment of the present invention.

FIG. 5 is a view illustrating the U-shaped lamp inserted into an inserting part formed in a side supporter 420 in an embodiment of the present invention.

Referring to FIG. 5, the plate 422 is arranged in a lower part of the inserting part 421 and comes in contact with the end of a lower part of the inserted U-shaped lamp 430 to support the lamp 430. That is, the plate 422 supports the lamp 430 by providing a tension to both sides of the inserted U-shaped lamp 430 using the boss 423 as a support shaft.

The boss 423 may be formed integrally with the plate 422.

Figure 6A:
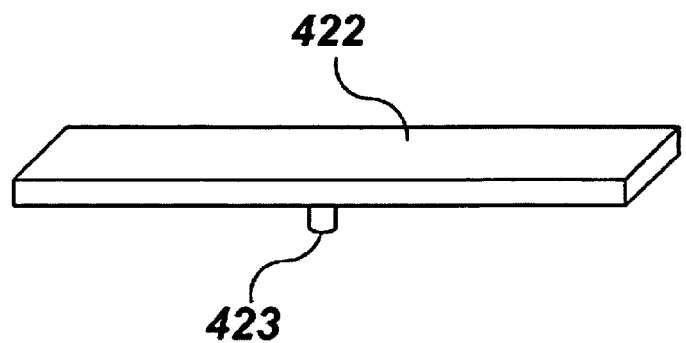
FIGS. 6A and 6B are views explaining a principle of supporting the U-shaped lamp in an embodiment of the present invention.
Figure 6B:
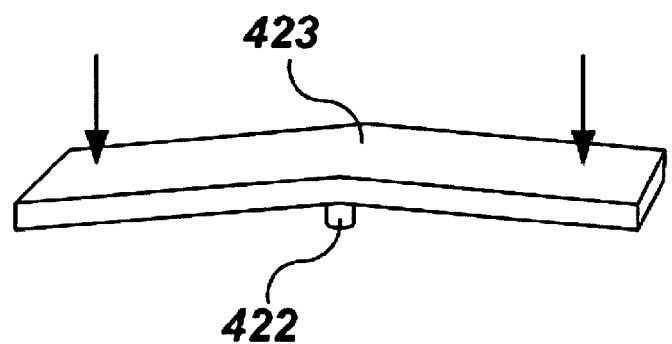

FIGS. 6A and 6B are views explaining a principle of supporting the U-shaped lamp in an embodiment of the present invention.

Referring to FIG. 6A, the lamp support member includes the plate 422 that is a tension bar and the boss 423, and referring to FIG. 6B, when the lamp 430 is inserted to be fastened with the bottom cover 410, the tension bar 422 in which the boss 423 is formed is under tension, and the lamp 430 is fastened to the side supporter 420 while somewhat overlapping with the side supporter 420.

Accordingly, the lamp 430 is supported by the plate 422 arranged within the inserting part 421, so that vibration between the lamp 430 and the bottom cover 410 or the side supporter 420 can be prevented. That is, even if a tolerance between the lamp 430 and the inserting part 421 is taken into account, the lamp 430 can be stably fastened to the bottom cover 410 by the tension of the 422 plate.

The lamp support member may be made of the same material as the side supporter, but may also be made of a different material having elasticity.

The lamp 430 is arranged at the inside of the bottom cover 410 to correspond to a position of the inserting part 421 of the side supporter 420, and the lamp 430 is inserted between the lamp support member and a lower wall of the inserting part 421 of the side supporter 420.

Figure 7:
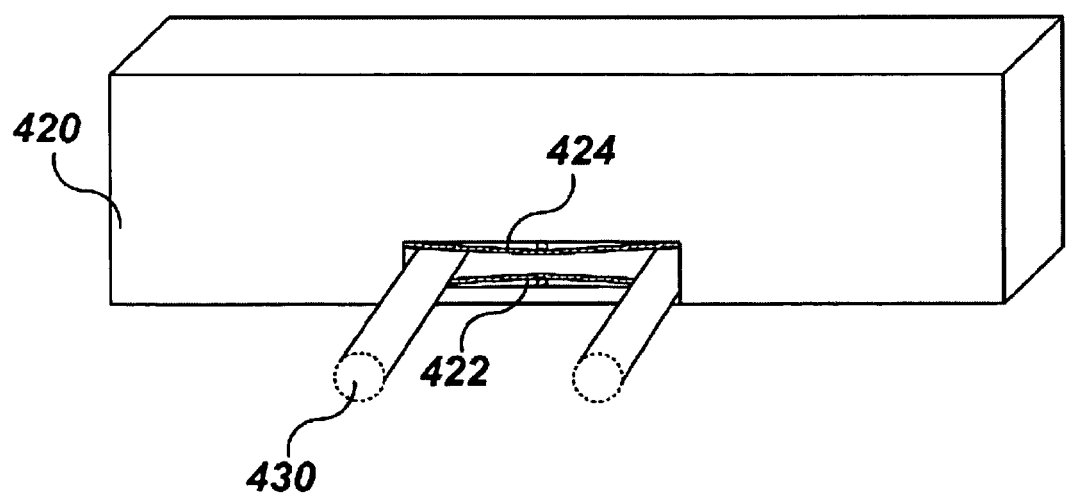
FIG. 7 is a view illustrating a U-shaped lamp in another embodiment of the present invention inserted into an inserting part formed in a side supporter.

FIG. 7 is a view illustrating a U-shaped lamp inserted into an inserting part formed in a side supporter in another embodiment of the present invention.

Referring to FIG. 7, the plate 422 in which the boss 423 is formed is arranged at an upper part as well as a lower part of the inserting part 421 in the side supporter 420.

That is, the plate 424 in which the boss is formed is arranged even at an upper part of the inserting part 421 so that the lamp 430 may be more stably inserted and fixed into the inserting part 421.

Figure 1:
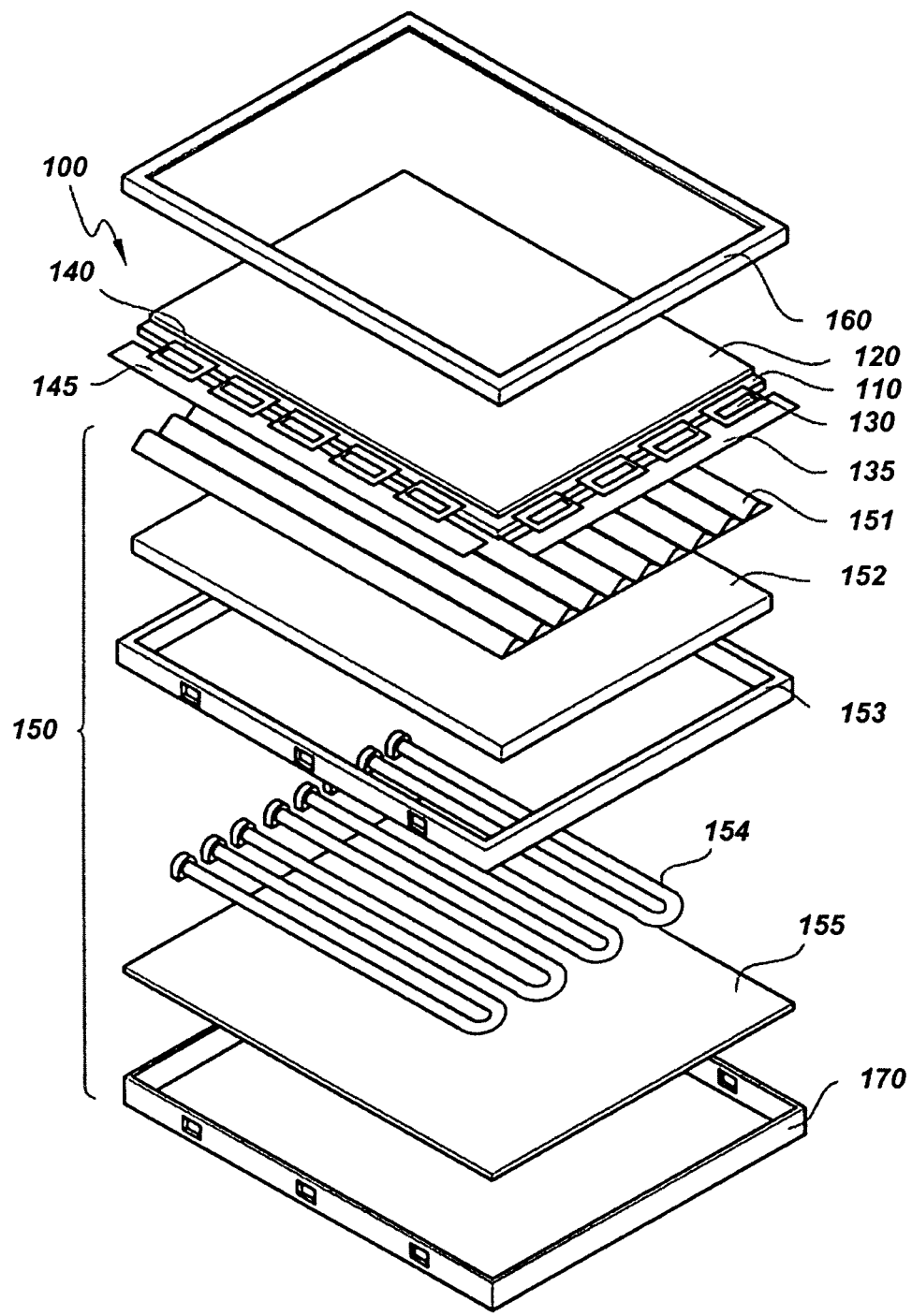
FIG. 1 is an exploded perspective view of a liquid crystal module including a backlight using a general U-shaped lamp.
Figure 2:
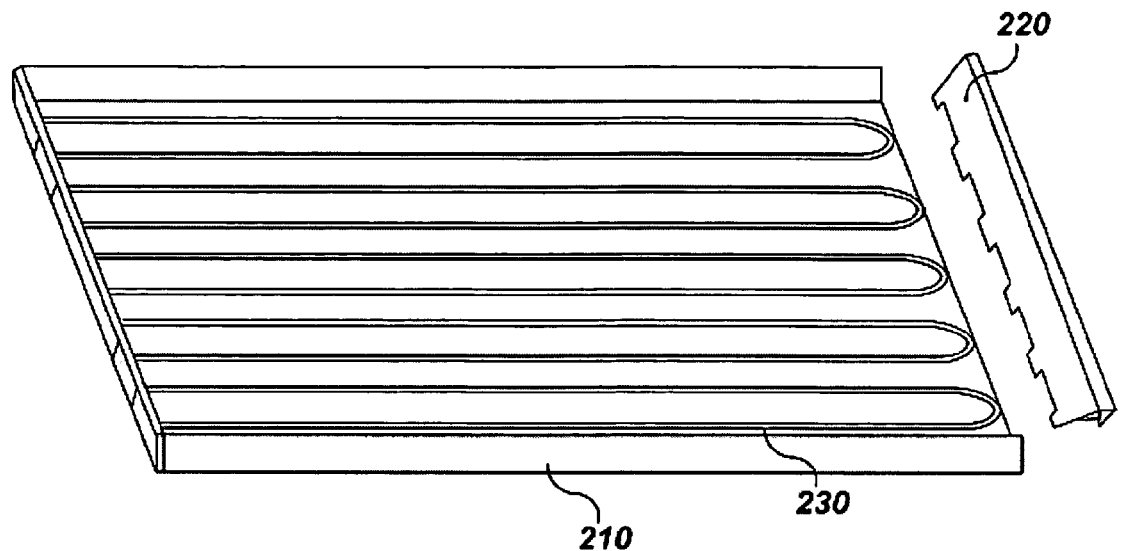
FIG. 2 is a view illustrating a backlight assembly in the related art using a U-shaped lamp.
Figure 3:
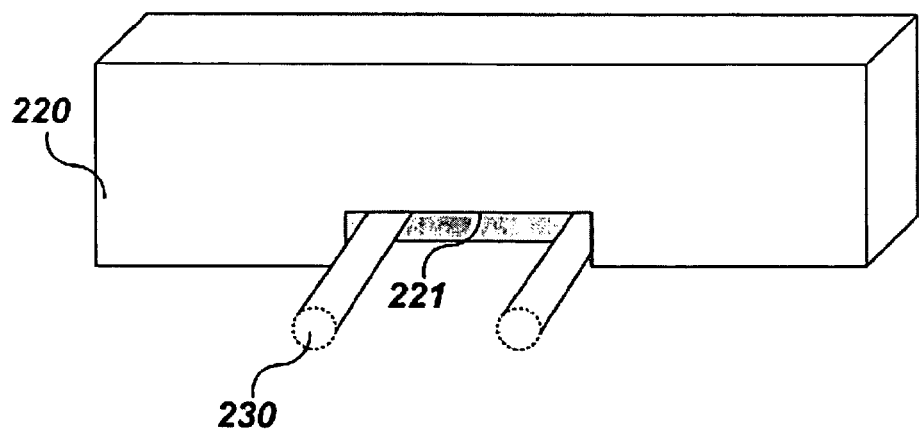
FIG. 3 is a view illustrating the U-shaped lamp of FIG. 2 inserted into an inserting part formed in a side supporter.
Figure 8:
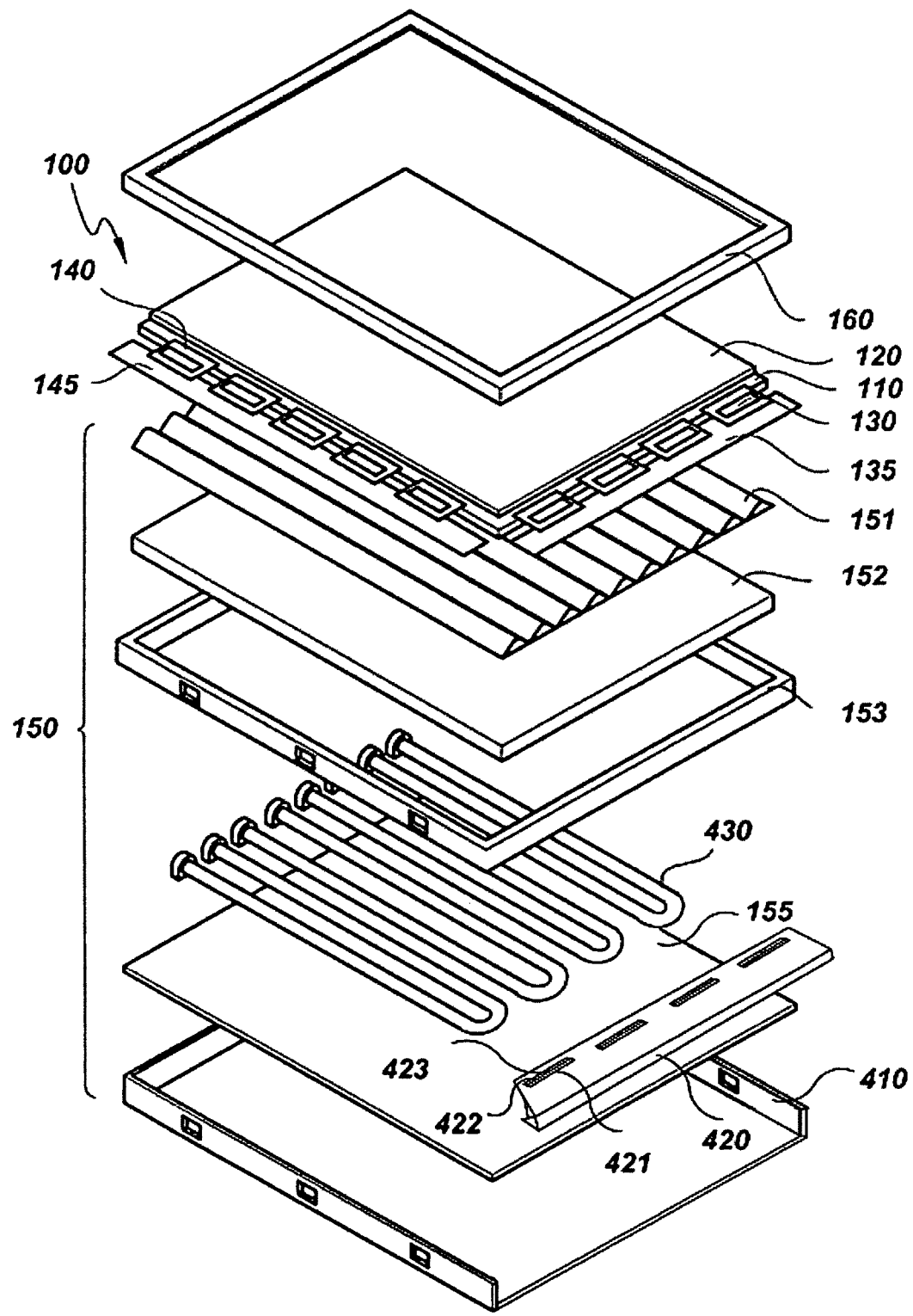
FIG. 8 is an exploded perspective view of an embodiment of a liquid crystal module including a backlight using a U-shaped lamp.

FIG. 8 is an exploded perspective view of an implementation of a liquid crystal module including a backlight using a U-shaped lamp. For convenience, reference numerals used in FIGS. 1 and 4 are used.

Referring to FIG. 8, the liquid crystal module includes a liquid crystal panel 100, a backlight assembly 150, and a top cover 160.

The backlight assembly 150 includes at least one U-shaped lamp 430, a lamp housing 410 in which the lamp 430 is provided, a side supporter 420 that is fastened to a lamp housing 410 and in which an inserting part 421 for inserting the lamp 430 is formed, and a lamp support member for supporting and fixing the lamp 430 within the inserting part 421 of the side supporter 420.

The lamp support member is formed by coupling of the plate 422 and the boss 423. In more detail, the lamp support includes the plate 422 that is arranged in an upper part or lower part of the inserting part 421 and that comes in contact with the end of the upper part or lower part of the inserted U-shaped lamp 430 to support the lamp and the boss 423 that is formed in a central part of the plate 422.

As shown in FIG. 8, an implementation of a backlight assembly of a liquid crystal display includes a plurality of lamps 430 that are U-shaped cold cathode fluorescent lamps (CCFL).

The liquid crystal panel 100 includes a lower substrate 110, an upper substrate 120, liquid crystal (not shown), a gate tape carrier package (TCP) 130, a gate PCB 135, a data TCP 140, and a data PCB 145.

The lower substrate 110 includes a gate line, a data line, a thin film transistor, and a pixel electrode. The upper substrate 120 is positioned above and opposite to the lower substrate 110, and the upper substrate 120 includes a common electrode and a color filter that are not shown. When the common electrode is configured for an IPS mode, the common electrode may be formed on the lower substrate 110.

The gate TCP 130 is connected to each gate line formed on the lower substrate 110, and the data TCP 140 is connected to each data line formed on the lower substrate 110.

Several circuit components for processing both a gate driving signal and a data driving signal are mounted in the gate PCB 135 and the data PCB 145 in order to input a gate driving signal and a data driving signal to the gate TCP 130 and the data TCP 140, respectively.

The backlight assembly 150 includes the optical sheet 151, the diffusion plate 152, the support main 153, the U-shaped lamp 430, and the reflecting plate 155.

That is, the U-shaped lamp 430 irradiates light, and the reflecting plate 155 below the U-shaped lamp 430 reflects light emitted from the lower part of the lamp 430 toward the upper diffusion plate 152.

After light irradiated from the U-shaped lamp 430 and light reflected by the reflecting plate 155 is diffused to have uniform brightness by the diffusion plate 152, the combined light is focused by the optical sheet 151 such as a prism.

The elements of the backlight assembly 150 described above are in an internal space defined by coupling the support main 153 and the bottom cover 410, and the bottom cover 410 is also coupled to a top cover 160 to form a liquid crystal module.

A backlight assembly for a liquid crystal display according to this invention may stably fix a U-shaped lamp and may not use a lamp holder for preventing sound vibration, so that when manufacturing a backlight assembly for a liquid crystal display, the cost may be reduced and performance can be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight assembly for a liquid crystal display comprising:
   one U-shaped lamp including a first section, a second section, and a middle section connecting the first section and the second section in the U-shape;
   a lamp housing including the lamp and a reflecting plate;
   a side supporter fastened to the lamp housing at a side where the middle section is disposed, and including an inserting part having a rectangular shape configured to insert and hold the first section and the second section of the lamp therein; and
   at least one lamp support member disposed at one of an upper part and a lower part within the inserting part of the side supporter to provide a tension between the U-shaped lamp and the inserting part by contacting with the first section and the second section for supporting and fixing the lamp to the side supporter,
   wherein the lamp support member includes:
      a plate supporting the lamp by coming in contact with the end of the inserted U-shaped lamp; and
      a boss that is formed at a central part of the plate.

2. The backlight assembly of claim 1, wherein the plate is a tension bar having an elastic force.

3. The backlight assembly of claim 2, wherein the plate supports the inserted U-shaped lamp by providing a tension force to both sides of the lamp using the boss as a support.

4. The backlight assembly of claim 1, wherein the boss is formed integrally with the plate.

5. The backlight assembly of claim 1, wherein the lamp is inserted and fixed between the lamp support member and one of an upper wall and a lower wall of the inserting part of the side supporter.

6. The backlight assembly of claim 1, wherein the lamp housing is a bottom cover where one side thereof is opened to be fastened to the side supporter.

7. The backlight assembly of claim 1, wherein the lamp is arranged in a line at the inside of the bottom cover corresponding to a position of the inserting part of the side supporter.

8. A liquid crystal module comprising:
   a liquid crystal panel with a liquid crystal between an upper substrate and a lower substrate;
   a backlight that supplies light to the liquid crystal panel;
   an optical scattering means between the backlight and the liquid crystal panel that supplies the light to the liquid crystal panel so that light supplied from the backlight has uniform brightness distribution; and a top cover fastened to a bottom cover within the backlight to protect the liquid crystal panel, the backlight comprises:

one U-shaped lamp including a first section, a second section, and a middle section connecting the first section and the second section in the U-shape;

a lamp housing including the lamp and a reflecting plate;

a side supporter fastened to the lamp housing at a side where the middle section is disposed, and including an inserting part having a rectangular shape configured to insert and hold the first section and the second section of the lamp therein; and at least one lamp support member disposed at one of an upper part and a lower part within the inserting part of the side supporter to provide a tension between the U-shaped lamp and the inserting part by contacting with the first section and the second section for supporting and fixing the lamp to the side supporter, wherein the lamp support member includes:

a plate supporting the lamp by coming in contact with the end of the inserted U-shaped lamp; and a boss that is formed at a central part of the plate.

9. The liquid crystal module of claim 8, wherein the plate is a tension bar having an elastic force.

10. The liquid crystal module of claim 9, wherein the plate supports the inserted U-shaped lamp by providing a tension force to both sides of the lamp using the boss as a support.

11. The liquid crystal module of claim 8, wherein the boss is formed integrally with the plate.

12. The liquid crystal module of claim 8, wherein the U-shaped lamp is inserted and fixed between the lamp support member and one of an upper wall and a lower wall of the inserting part of the side supporter.

13. A manufacturing method of a backlight assembly for a liquid crystal display comprising:

providing one U-shaped lamp including a first section, a second section, and a middle section connecting the first section and the second section in the U-shape, in a lamp housing including a reflecting plate at the inside of a bottom cover thereof;

fastening a side supporter including an inserting part having a rectangular shape configured for inserting and holding the first section and the second section of the lamp therein, to a lamp housing at a side where the middle section is disposed; and supporting and fixing the lamp to the side supporter by disposing at least one lamp support member at one of an upper part and a lower part within the inserting part of the side supporter and by contacting with the first section and the second section to provide a tension between the U-shaped lamp and the inserting part, wherein the lamp support member includes:

a plate supporting the lamp by coming in contact with the end of the inserted U-shaped lamp; and a boss that is formed at a central part of the plate.

14. The manufacturing method of claim 13, wherein the plate is a tension bar having an elastic force.

15. The manufacturing method of claim 14, wherein the plate supports the inserted U-shaped lamp by providing a tension force to both sides of the lamp using the boss as a support.

16. The manufacturing method of claim 13, wherein the boss is formed integrally with the plate.

17. The manufacturing method of claim 13, wherein providing of the lamp in a lamp housing includes inserting and fixing the lamp between the lamp support member and one of a upper wall and a lower wall of the inserting part of the side supporter.

* * * * *